A. J. MOTTLAU.
MECHANICAL MOVEMENT.
APPLICATION FILED DEC. 28, 1914.

1,195,385.

Patented Aug. 22, 1916.
6 SHEETS—SHEET 1.

FIG. 1.

WITNESSES

INVENTOR
August J. Mottlau

UNITED STATES PATENT OFFICE.

AUGUST J. MOTTLAU, OF PHILADELPHIA, PENNSYLVANIA, ASSIGNOR TO MOTTLAU TRANSMISSION, INCORPORATED, OF NEW YORK, N. Y., A CORPORATION OF NEW YORK.

MECHANICAL MOVEMENT.

1,195,385.  Specification of Letters Patent.  Patented Aug. 22, 1916.

Continuation of application Serial No. 634,564, filed June 21, 1911. This application filed December 28, 1914. Serial No. 879,249.

*To all whom it may concern:*

Be it known that I, AUGUST J. MOTTLAU, a citizen of the United States, residing in the city and county of Philadelphia, in the State of Pennsylvania, have invented certain new and useful Improvements in Mechanical Movements, of which the following is a true and exact description, reference being had to the accompanying drawings, which form a part thereof.

My present invention relates to mechanical movements and is adapted for use for a great many purposes and under varying conditions. It will be found particularly adapted for service as a transmission device for transmitting power from a driving member to a driven member, as for instance, from a driving shaft to a driven shaft. It may advantageously be used in connection with such mechanism as applied to an automobile, and will be found generally available wherever a transmission device is applicable.

My invention, which is capable of utilization in many different forms, is of the general type in which periodically moving, driving and driven elements are alternately connected, so that the one is moved by the other, and disconnected to permit the one to move freely relative to the other, and is distinguished from other apparatus of this general type by the provisions made for intermittently locking the parts against relative movement by trapping liquid between the said parts; the pressure to which the trapped liquid is subjected being in proportion, though not necessarily in constant proportion to the force with which the driving element acts on the driven element.

A novel characteristic of my invention distinguishing it from heretofore known forms of power transmissions, in which a liquid under pressure and moving against pressure is employed, is found in the fact that with my invention the liquid trapped and under pressure is motionless with respect to the parts by which it is trapped, and in consequence with my invention the liquid put under pressure is not heated, as is the case where the liquid under pressure is moved through restricted ports or is otherwise moved against frictional resistance.

One of the many forms of apparatus in which the general principle of my invention is utilized, is illustrated in the accompanying drawings, wherein.

In the embodiment of the invention presented in the accompanying drawings, a driving shaft A is illustrated to which is attached a plurality of extensible connecting rods C, or as they might be termed coöperating pistons and cylinders. These are arranged in what I conceive to be a desirable form wherein they are disposed radially with respect to the axis of rotation of the driving shaft, and means are provided for insuring the requisite movements of the transmission device varying from a position wherein no motion is transmitted through various degrees of transmission, to the point wherein the driven shaft revolves at the same rate of speed as the driving shaft. Such means, as I have illustrated the same, comprise a device adapted to convert the rotations of the driving member into reciprocations of the extensible connecting rods, and the particular form of device illustrated is a crank B which connects the driving shaft to the inner end of the extensible connecting rod. The outer ends of the connecting rods are connected with means for transforming the reciprocatory movements of the connecting rods into rotary movements and communicating the same to the driven shaft. Such means as illustrated comprise a crank D which is connected to a driven shaft E by a suitable gearing. Means are provided for varying the extent of movement transmitted to the driven shaft which as illustrated comprise the provision of means for adjusting one of the cranks.

In the drawings the crank B is shown as adjustable whereby variable motion depending upon the adjustment of the said crank pin is communicated to the connecting rods. By the foregoing devices and particularly by reason of the adjustability of the connection between the driving shaft and the connecting rod the important feature is presented that while the driving shaft is at full speed and the said connection is concentric with the said shaft, no movement of the driven shaft or of the parts intermediate the shafts, takes place. I do not however, regard it as essential to the performance of the transmitting function that the crank B should be the adjustable one, as either crank could be made adjustable.

A further important feature lies in the extensible connecting rod which, as illustrated, has two members, each of which is provided with a port and a closure therefor, and which therefore are operable independently of each other at certain periods.

The device as above set forth, broadly speaking as to the specific embodiment thereof illustrated, may therefore be viewed as consisting generally of driving and driven mechanism, the driving mechanism comprising the driving shaft, adjustable crank, and inner ends of the extensible connecting rods, and the driven mechanism comprising the outer ends of the extensible connecting rods, the driven cranks, the driven shaft and the intermediate connections. Means are provided for communicating power from the driving parts to the driven parts which are operable in various positions, and which comprise a fluid, preferably a liquid, which is admitted through suitable ports in the respective parts of each extensible connecting rod. The extensible connecting rods are illustrated as hollow and form a chamber which is of varying size adapted to be enlarged as the parts of the connecting rod are separated and to be restricted as they approach. Both members of the extensible connecting rods are provided with ports leading into this chamber which are covered periodically by valves. These valves are adapted to uncover their respective ports periodically, and when the ports are uncovered and while the rod is being extended the fluid flows into the chamber and it then forms a practically solid connection between the members of each connecting rod. The connecting rods may operate to transmit motion from the driving to the driven member either by pulling or pushing and the valves will be adjusted to cover the ports accordingly. The valves are coincidently closed in both members during a working stroke. In the particular embodiment illustrated motion is adapted to be transmitted through the connecting rods in their outward or pushing movement. Accordingly as illustrated each of the said ports is uncovered during the inward movement or movement toward the center of its connected part and each of the said ports is covered during movement in the opposite direction. With the crank B adjusted to its extreme eccentricity each rotation of the driving shaft will produce a rotation of the driven shaft. Should the said crank be adjusted for instance to one-half its full eccentricity, the rates of movement will vary and the crank D will be rotated only once to two rotations of the crank B. Hence a working stroke will not take place during each rotation of the driving crank, but only during every other rotation. Such working stroke will occur when both parts of each extensible connecting rod are on their outward movement. At this time both ports will be closed, and the liquid which was admitted into the chamber during the last preceding movement when the ports were open will now be sealed therein by the closing of said ports, and will act as a practically solid connection to transmit motion from the driving to the driven parts. It will be perceived that during the performance of such function the liquid is actually motionless, and this I regard as a very important feature in my invention as thereby the liquid remains cool and no interference in operation of the device arises from this source. In the drawings three sets of connecting rods are illustrated, and these are brought successively into operation whereby one connecting rod is constantly in position to give a working stroke to the driven shafts. A greater number than three may be employed and very probably will, although the operation of the invention is sufficiently illustrated in connection with three sets and therefore I have shown but this number although the invention is not limited thereto. These parts are so arranged as that motion communicated by the connecting rod then working is transmitted to the driven shaft, which in turn moves the then non-working gears and outer connecting rods.

By means of the devices illustrated the connecting rod not only has a variable stroke due to the adjustable driving crank employed, but also changes its length for successive complete movements in all positions wherein it is fulfilling the function of an adjustable transmission, to wit, wherein it is employed to reduce speed and increase power.

I am aware that my invention is capable of embodiment in apparatus of apparently widely differing structural features which yet contain the broad principle thereof, and owing to the many modifications which may be made therein by a skilled mechanic and the many equivalent devices which may be substituted for those illustrated, I have not attempted to illustrate the same, but have preferred to embody my invention in what I conceive to be a desirable and useful form, which I will now proceed to describe more in detail.

Figure 1:
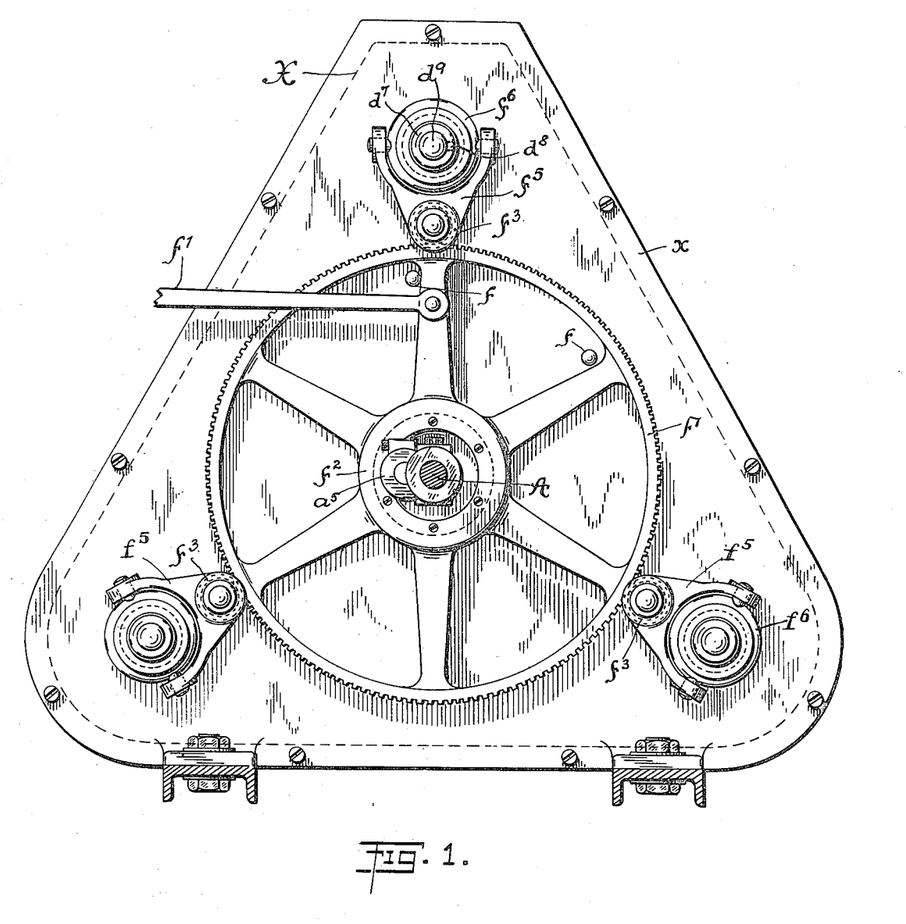
Figure 1 is an end elevation of an apparatus containing my invention, illustrating the reversing means employed by me and also means for varying the throw of the driving crank.

My device is preferably inclosed as to its operative parts within a casing X which may have a removable front plate $x$ and is illustrated as provided with a cover $x'$. This casing preferably contains a liquid, the height of which is indicated at $y$ and in which I prefer to operate my apparatus. For this purpose oil may well be employed and furnishes a desirable means of lubricating the device and connecting the members of each connecting rod. I will first describe the means whereby the driving crank D is adjusted in position relative to the driving shaft A and is rotated thereby. Such means comprise a counter-shaft $a$, well illustrated in Fig. 7, upon the inner end of which the adjustable crank B is mounted so as to be turned thereby. The said counter shaft $a$ is rotatable relatively to the shaft A and is revolved therewith, and furnishes the means whereby the driving crank B is adjusted relative to the shaft A and is rotated thereby. Pinned to the counter-shaft $a$ by pins $a'$ (seen in Fig. 7) is a sleeve $a^2$ and this sleeve carries a slot $a^3$ (Fig. 5) which is inclined relatively to the longitudinal axis of the counter-shaft. A pin $a^4$ is carried by a collar $a^5$ (Figs. 1 and 5) and enters the said slot. This collar is in two parts, the other of which embraces the driving shaft A and is movable thereon. It is connected by plates $a^6$ to a sliding collar $a^7$ upon said main shaft which has a channel receiving the forked end of lever $a^8$ (Fig. 5) carrying rollers which engage the sides of said channel and move the said frame. Thereby as the handle $a^8$ is moved, the sleeve $a^2$ is turned carrying with it countershaft $a$ and crank B.

Figure 7:
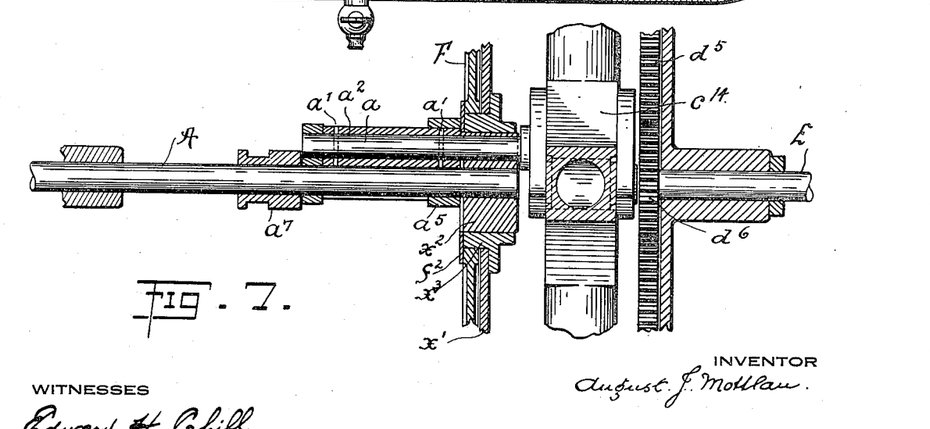
Fig. 7 is a horizontal section on the line 7—7 of Fig. 4 of the device.

The counter shaft $a$ is caused to revolve with the main driving shaft A by any suitable means, as for instance, by key $a^9$ (Fig. 4) by which the main shaft is keyed in bearing block $x^2$ mounted to turn in a frame $x^3$ inside of the front casing $x$ and which has shoulders passing through the said casing and supporting the bearing block $x^2$. The counter-shaft $a$ passes through said bearing block $x^2$ as seen in Fig. 7.

Figure 14:
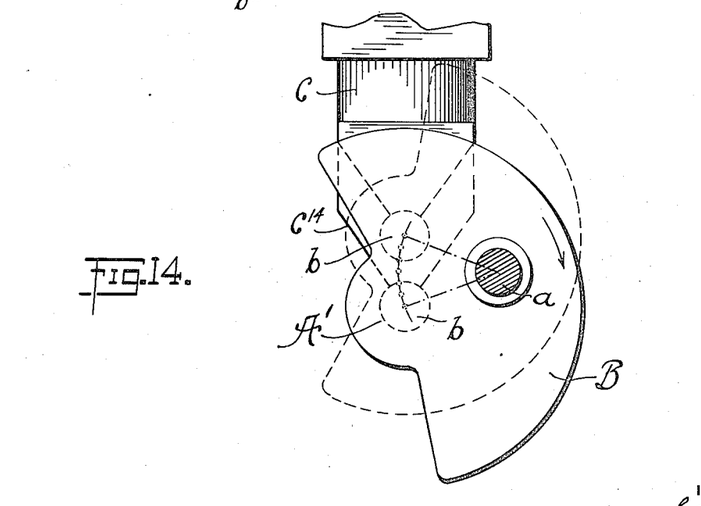
Fig. 14 is a diagrammatic view illustrating the adjustment of the driving crank with relation to the axis of rotation of the driving shaft.

The inner end of the counter shaft $a$ is fixed so as to turn with the driving crank B. In Fig. 14 the attachment of the said counter-shaft to the driving crank is illustrated and lettered $a$. The center of the said driving crank is lettered $b$ and the axis of rotation thereof which corresponds with the axis of rotation of the driving shaft A is lettered $A'$. The small circles intermediate the full line position of the center $b$ of the said crank and its dotted line position illustrate some of the numerous positions intermediate the position wherein the center of the said crank is coincident with the axis of rotation of the shaft A and consequently no motion is communicated therefrom and the position wherein its said center of rotation is adjusted to its limit of eccentricity with relation to the said shaft, and the driven shaft is rotated at the same rate of speed as the driving shaft. The crank B has a central pin or rod $b$ connecting two flanges $b'$ $b^2$ (Fig. 4) both of which are mutilated as illustrated in Fig. 14 having a little less than one-half of their diameters removed. Flange $b^2$ is illustrated as formed integral with the central pin $b$ whereas flange $b'$ for purposes of assemblage is made separate and held in place for instance, by screws $b^3$. Each of the said flanges is provided on its inner face with an annular rib $b^4$ $b^5$ for a purpose to be described.

Figure 2:
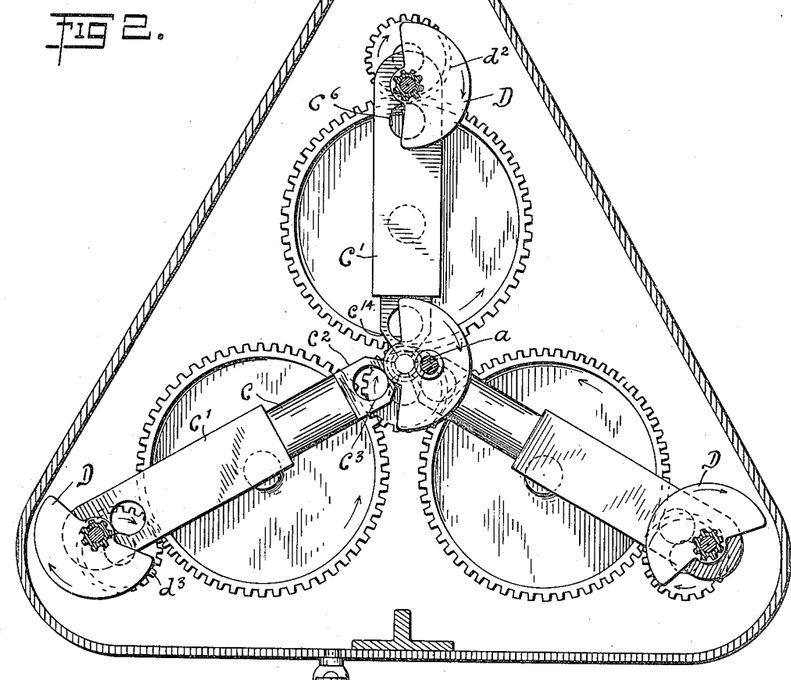
Fig. 2 is a vertical section of the said device on the line 2—2 of Fig. 4.
Figure 3:
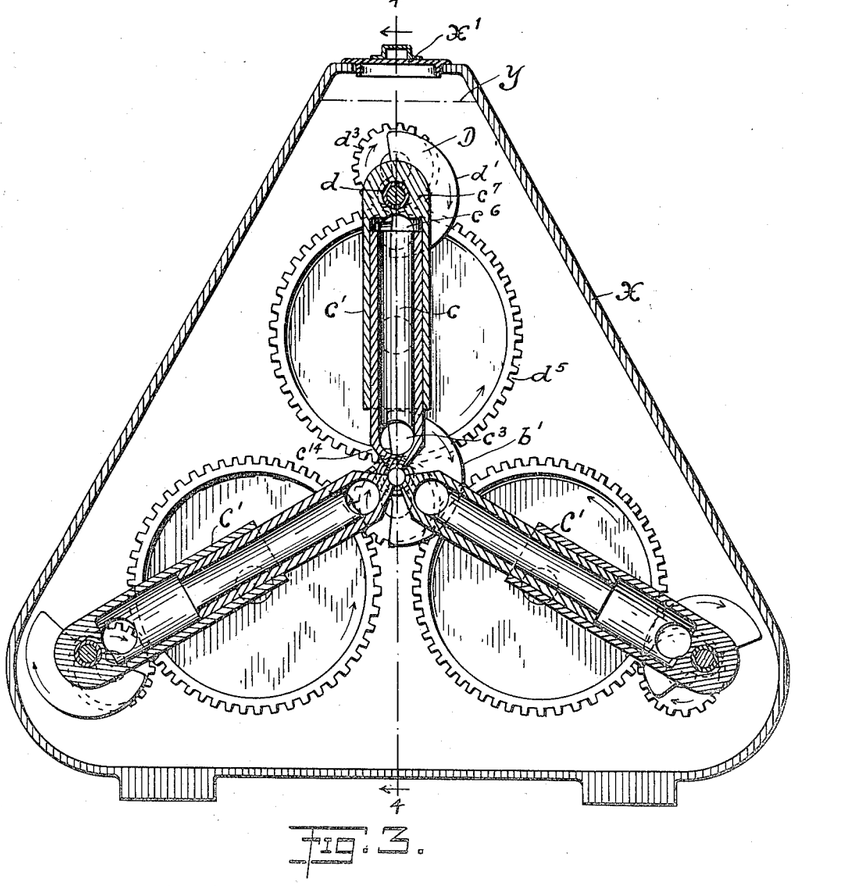
Fig. 3 is a vertical section on the line 3—3 of Fig. 4.
Figures 4, 5, 6:
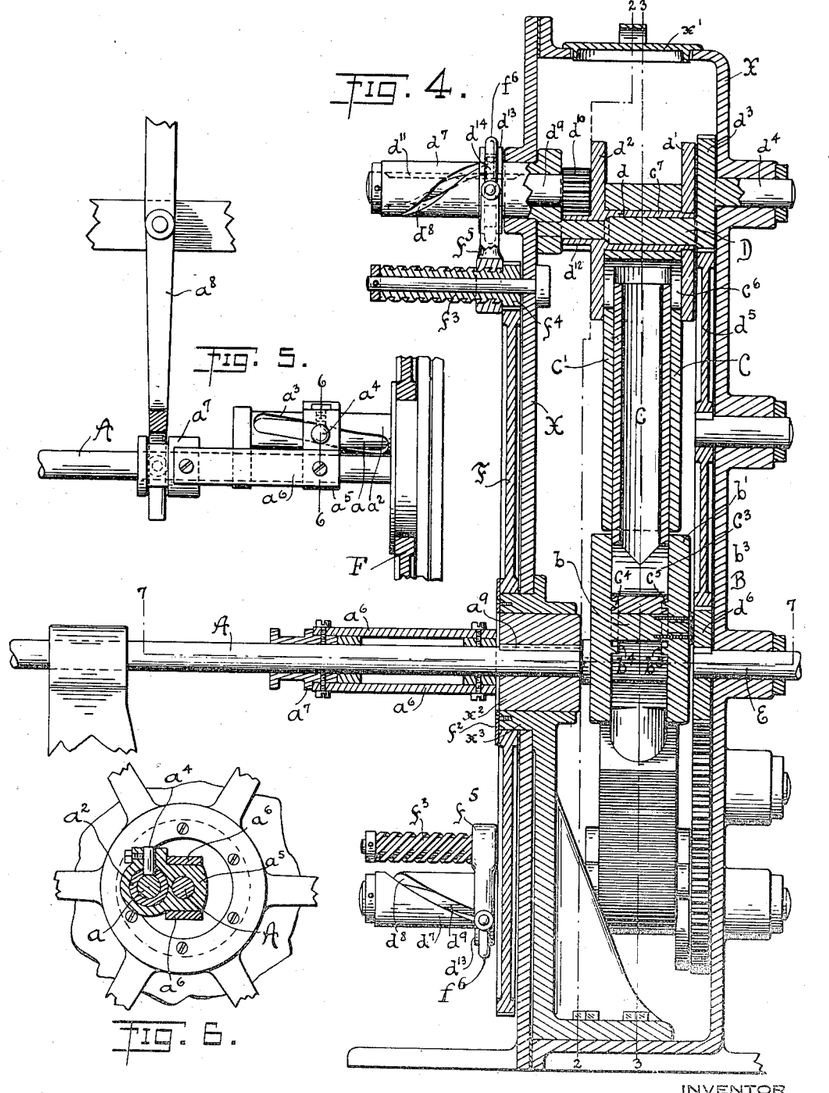
Fig. 4 is a vertical cross section of the device on the line 4—4 of Fig. 3.
Fig. 5 is a detailed view of the driving crank adjusting device and illustrating also the main reversing gear in section.
Fig. 6 is a transverse section on the line 6—6 of Fig. 5, of the driving crank by adjusting means.

The extensible connecting rods C are illustrated in section in Figs. 3 and 4. In the particular form in which said connecting rods are illustrated they comprise hollow telescoping members consisting of an inner or piston member $c$ and an outer or cylinder member $c'$. The inner member $c$ is illustrated as cylindrical throughout the larger part of its length, terminating on its inner end in a squared part $c^2$, Fig. 2, in the sides of which next the valve flanges $b'$ $b^2$ is a port $c^3$ which extends entirely through the said piston. The inner ends of the pistons are preferably beveled at $c^{14}$, terminating in an inner wall having on each side channels $c^4$ $c^5$ which receive ribs $b^4$ $b^5$ formed on flanges $b'$ and $b^2$ and establish a connection between the crank and the piston $c$ which permits the said piston to turn upon the crank and to be reciprocated thereby.

The outer end of each extensible connecting rod C is likewise provided with a lateral port $c^6$ which extends from side to side thereof. The said cylinder member $c'$ is perforated axially at $c^7$ to receive the tubular shaft or hub portion of a corresponding valve member $d$ which is mounted on a corresponding crank pin D. Secured to the hub portion and forming a part of the valve member $d$ are mutilated disk valves $d'$ $d^2$ which are adapted to close and open the ends of the corresponding port $c^6$ as desired. Each of the valves $d'$ $d^2$ and $b'$ $b^2$ are so proportioned and operated with respect to their mutilated parts that during their rotation they are adapted to uncover the ports upon the inward movement of their respective cylinders or pistons. By inward movement I mean the movement of the piston in a direction away from the corresponding crank D and toward the center or axis of rotation of the main shaft and the movement of the cylinder in the same direction. Upon the opposite movement of either of said parts its respective port is closed. This is clearly shown in the diagrammatic Figs. 8 to 13 wherein the axis of rotation or center of the main driving shaft is designated $A'$ and the center of the crank B is designated $b$. The outer member of the extensible connecting rod is similarly constructed to the inner member in this respect, its port is also open on the inward movement of the said cylinder and closed on the outward movement. By reason of the fact that the rotation of the outer crank may not coincide with the rotation of the inner crank, a period will arrive when the inner crank is on its outward movement and the outer crank is on its inner movement. Such a condition is illustrated in Fig. 13 wherein the port of the piston is covered but the port of the cylinder is uncovered, permitting the parts to move freely. A working stroke is only performed when the ports in both piston and cylinder members are covered; for instance, as illustrated in Fig. 10, where both cranks are on their outer journey and motion is being transmitted through the liquid within the hollow connecting rod.

The reciprocating motion from pistons and cylinders is transformed into rotary motion by suitable means, as for instance, the cranks D, whence it is communicated by any desired mechanism to the driven shaft E or other point of application of the power. In the particular construction illustrated in detail in the drawings, each crank D comprises front and back crank carriers or arms having coaxial shaft portions $d^4$ and $d^7$ journaled in bearings provided in the back and front walls respectively of the casing X. Each crank D comprises a gear $d^3$ coaxial with the shaft portions $d^4$ and $d^7$, and connected to the gear $d^6$ secured to the driving shaft E through a corresponding idler gear $d^5$ journaled in the back wall of the casing.

Each valve member $d$ is normally secured to the crank D by which it is carried so that there can be no relative movement between them, but advantageously provisions are made for angularly adjusting each valve member $d$ relative to its supporting crank D in order to reverse the direction of rotation of the driven shaft E. It is to be understood, however, that the means somewhat conventionally illustrated for thus effecting a reverse motion of the shaft E form but one example of appropriate means for this purpose, and that different or better means may be devised to accomplish the same result. As shown, the means for adjusting the valve member $d$ relative to the crank comprise a shaft $d^9$ journaled in the shaft portion $d^7$ which is tubular. The shaft $d^9$ is provided at its inner end with a spur gear $d^{10}$ in mesh with a spur gear $d^{12}$ formed on the valve member $d$. The shaft $d^9$ is formed with a longitudinal slot $d^{11}$ and the tubular shaft portion $d^7$ is formed with a helical slot $d^8$. Slidingly mounted on the tubular shaft $d^7$ is a collar $d^{13}$ provided with a pin $d^{14}$ which extends inward through the slot $d^8$ in the tubular shaft $d^7$ into the longitudinal slot $d^{11}$ in the shaft $d^9$. When the collar $d^{13}$ is held against movement in a direction parallel to the axis of the shafts $d^7$ and $d^9$, the latter are keyed together and the valve member $d$ is therefore held against angular movement with reference to the portion of the crank D on which it is mounted. By moving the collar $d^{13}$ longitudinally of shaft $d^7$, the pin $d^{14}$ traveling both in the longitudinal slot and in the helical slot causes a rotation of the shaft $d^9$ relative to the shaft $d^7$ thereby rotating the valve member $d$ on the crank D. To effect this longitudinal movement of each collar $d^{13}$ there is provided adjacent each shaft $d^7$, a shaft $f^3$ journaled on the front wall of the casing X and provided adjacent its inner end with a spur gear $f^4$ and having its outer portion formed with helical threads. The threaded end of the shaft $f^3$ is received in the threaded aperture of an arm $f^5$ which is connected to a collar $f^6$ rotatably received in a peripheral groove formed in the member $d^{13}$. The spur gears $f^3$ mesh with a large gear F journaled on a bushing $x^2$ mounted in the front wall of the casing and held in place by the ring $f^2$ seen in Figs. 4 and 7 and screws entering the said bushing. A rod $f'$ attached to the gear F may be connected with a handle or other means not shown for adjusting the reverse gear. Stops $f$ secured to the front wall of the casing $x$ limit the angular movement of the gear F to that which through the instrumentalities referred to will adjust each valve member $d$ on the corresponding crank D through an angle of 180°. This has the effect of reversing the position of rotary valves $d'$ $d^2$ with relation to the port $c^6$ so that the said ports will be covered when they were formerly uncovered and vice versa. The reversing of said ports will occur with all of the cylinders at the same time.

The operation of my improved mechanical device will it is thought be easily ascertained from the foregoing description in connection with the drawings. The shifting lever $a^8$ being moved will cause pin $a^4$ to move lengthwise of the counter shaft $a$, revolving the same in its bearing relative to the main shaft A and adjusting the crank B to a position eccentric to the axis of rotation of the driving shaft A, assuming the dotted line position shown in Fig. 14. It may be assumed that the driving crank B has not been adjusted to the full extent shown in Fig. 14, but that it has been adjusted to an intermediate position wherein the driven shaft will receive one rotation for two rotations of the driving shaft. Such intermediate position of the driving crank is assumed in the diagrammatic Figs. 8 to 13 which illustrate a complete cycle of movements of the driving and driven cranks, ports and valves and show the various positions assumed by the ports. In these figures the end of the main driving shaft is designated $A'$. The center of the crank B is designated $b$. The direction of rotation of the inner or driving crank is clockwise as shown by the arrow, and in this form of my invention the inner crank always revolves in this direction. The outer crank revolves also in the same direction as indicated by the arrow upon the rotary valve when driving forward, but upon the operation of the reverse mechanism the direction of rotation of the outer crank would be changed. It is, of course, a matter of convenience and not of moment whether the inner crank or outer crank shall be the one to be reversed in position. In the position illustrated in Fig. 8 the driving crank B is at its outermost point and is just beginning its inward or non-working stroke, and therefore the cylinder port $c^3$ is just about to be uncovered. The driven crank D is just beginning its outward movement or movement away from the center in the normal working of the device, and its port $c^6$ is just beginning to be covered. No working stroke occurs for the reason that only one of the ports is covered, and the piston and cylinder move freely with relation to each other. In this adjustment the driving crank moves twice the distance of the driven crank. Therefore in Fig. 9 we find that the said driving crank has moved approximately one-third of a revolution and is just approaching its innermost position wherein it is farthest away from the fixed axis $d^4$. The driven crank has traveled only one-half the distance or one-sixth of a complete revolution, and therefore we find that its port $c^6$ has been completely covered, and that the driven crank is traveling outwardly with relation to its axis $d^4$ in position to receive a working stroke so soon as the inner port is covered.

Figure 9:
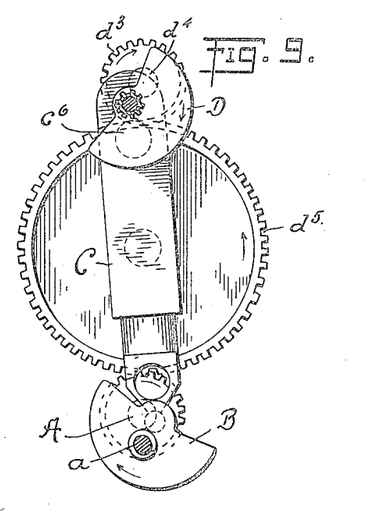
Figure 10:
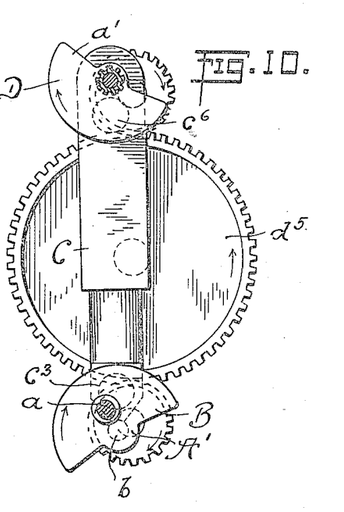

In Fig. 10 the driving crank has traveled approximately one-third of a revolution from the position indicated in Fig. 9. Here the driving crank is on its outward movement with the piston port $c^3$ covered, whereby it is adapted to transmit a working stroke, and this is actually transmitted owing to the fact that the driven crank D is at the same time moving outward and the rotary valve $d'$ covers the cylinder port $c^6$.

Figure 8:
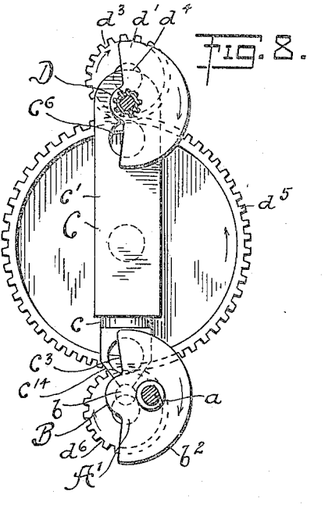
Figs. 8, 9, 10, 11, 12 and 13 are views illustrating the successive positions of the extensible connecting rod and the driving and driven cranks, ports and valves in a cycle of operations, wherein the driving crank is adjusted to one-half of its maximum extent whereby one revolution of the driven shaft will result from two revolutions of the driving shaft.
Figure 11:
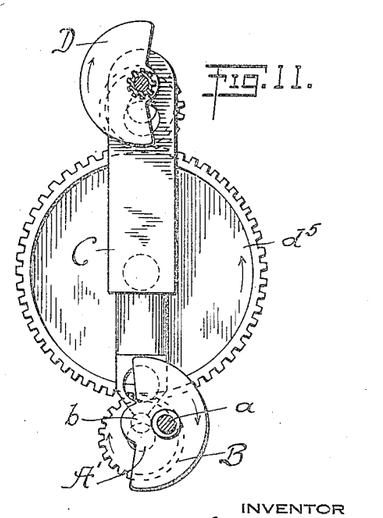

Fig. 11 indicates the position of the parts after having accomplished one-half of a complete cycle and the driving crank is here in the same position as in Fig. 8, it having accomplished one complete revolution, and the driven crank is in the reverse position from that illustrated in Fig. 8, it having accomplished but one-half of a revolution. The parts are here illustrated at the end of the working stroke and at the beginning of the non-working stroke, in which both parts are uncovered.

Figure 12:
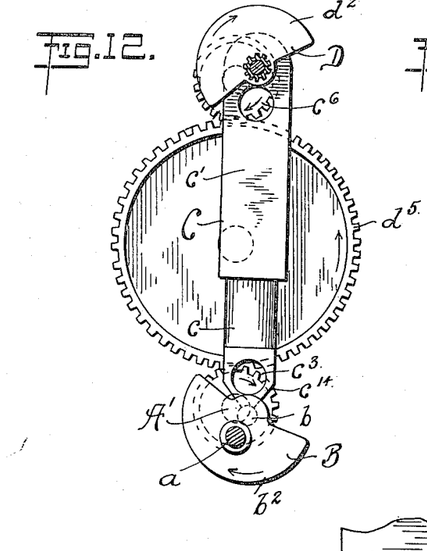
Figure 13:
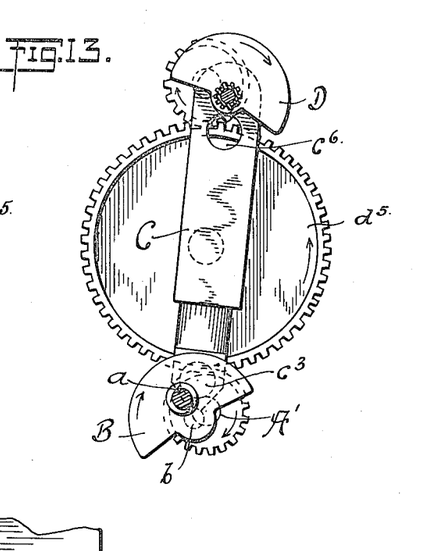

In Fig. 12 the driving crank has traveled another one-third of a revolution and the driven crank one-sixth and the parts are illustrated as having passed the middle of a non-working stroke.

In Fig. 13 the port $c^3$ of the piston is covered by the rotary valve of the driving crank and the driving crank is moving outwardly. Inasmuch, however, as the driven crank is moving inwardly the stroke of the piston is idle because the cylinder port $c^6$ is uncovered. From Fig. 13 the parts next pass to the position shown in Fig. 3 where a non-working stroke is illustrated.

It will therefore be seen from such diagrammatic representations that with the driving crank adjusted to transmit one rotation of the driven shaft for two rotations of the driving shaft and with the reversing gear in position to move the driving shaft in the forward direction that motion is communicated to the driven shaft from the driving shaft during approximately one-half a revolution of the driving shaft or one-quarter a revolution of the driven shaft, and that so far as any particular piston and cylinder are concerned the balance of the stroke is idle or non-working. It will also be perceived that in such adjustment a working stroke is achieved only when the driving crank and the driven crank are moving outwardly, at which time both of the ports are covered. It will also be perceived and is one of the important features of the invention that at all times when an idle or non-working stroke is taking place the ports in both the piston and the cylinder are open. The liquid, preferably oil, is permitted to flow freely into the chamber between the piston and cylinder if the parts are separating, or out of said chamber if they are approaching one another. Furthermore, upon the closing of the ports simultaneously and the consequent performance of a working stroke, the said liquid operates to transmit power from the driving crank to the driven crank, and at such time while it is under pressure, it does not move relatively to the inclosing piston and cylinder, and therefore it does not become heated and may be used for any desired length of time without any trouble from this cause.

The reverse mechanism illustrated causes the position of the rotary valves $d'$ $d^2$ to be reversed with relation to the cylinder ports $c^6$ so that the said ports shall be closed where they were formerly open and vice versa, and thereby the direction of movement of the crank D will be reversed.

Many changes in form, arrangement and details of construction may be made, and the particular mechanical connections illustrated in connection with my invention may be replaced by others without departing from the essential elements thereof as disclosed in the accompanying claims.

What I claim is:—

1. In a mechanical movement, a member adapted to be reciprocated, means for varying its extent of reciprocating movement, a rotary member driven thereby, and means for varying the length of said reciprocating member during each complete stroke thereof.

2. In a mechanical movement, a member adapted to be reciprocated, means for varying its extent of reciprocating movement, a rotary member driven thereby, means for varying the length of said reciprocating member during each complete stroke thereof, and means adapted to resist variations during a working portion of each complete stroke.

3. In a mechanical movement, a driving member, an adjustable crank connected thereto, a member connected to said crank and adapted to be reciprocated, a rotary member driven thereby, and means for varying the length of said reciprocating member during each complete stroke thereof.

4. In a mechanical movement, a driving member, a driven member, a hollow extensible connecting rod comprising two relatively adjustable members and provided with ports in each member, a valve for periodically closing one of said ports and a valve for closing the port in the other member for a working stroke, connections between said connecting rod and said driving and driven members, and means for adjusting one of said connections.

5. In a mechanical movement, a driving member, a driven member, a hollow extensible connecting rod provided with ports and valves for periodically closing same, and connections between each end of said connecting rod and said driving and driven members, one of said connections being adjustable.

6. In a mechanical movement, a driving member, a driven member, a plurality of similarly arranged hollow extensible connecting rods each provided with ports and valves for periodically closing same, connections between each end of each connecting rod and said driving and driven members, one of said connections for each rod being adjustable, said connecting rods being arranged for successive action.

7. In a mechanical movement, a driving member, a driven member, a hollow extensible connecting rod provided with ports, communicating motion from the driving to the driven member, connections between said connecting rod and said driving member and driven member, one of said connections being adjustable, and valves for closing said ports at predetermined periods.

8. In a mechanical movement, a driving member, a driven member, a hollow extensible connecting rod provided with ports, communicating motion from the driving to the driven member, connections between said connecting rod and said driving member and driven member, one of said connections being adjustable, valves for closing said ports periodically, and means for altering the position of one of said valves with relation to its port.

9. In a mechanical movement, a driving member, a driven member, a hollow extensible connecting rod provided with ports, communicating motion from the driving to the driven member, connections between said connecting rod and said driving member and driven member, one of said connections being adjustable, valves for closing said ports upon the outward movement of both ends of said rod, a plurality of similarly arranged connecting rods, ports and valves having a common driving means and individual connections to the driven member and adapted for successive action.

10. In a mechanical movement, a plurality of radial pistons and corresponding cylinders, a driving shaft, a connection therefrom to said pistons, means for adjusting said connection eccentrically to said shaft, a driven shaft, and cranks connected thereto and to each of said cylinders.

11. In a mechanical movement, a driving member, a plurality of driving reciprocating members, a common connection between said driving member and said reciprocating members, means for varying the length of stroke of said reciprocating members, a plurality of driven reciprocating members each coöperating with one of said driving reciprocating members, a driven member, a connection therefrom to each of said driven reciprocating members whereby the reciprocating movement thereof is converted into rotary movement of said driven member.

12. In a mechanical movement, a driving member, a plurality of hollow driving reciprocating members, a common connection between said driving member and said reciprocating members, means for varying the length of stroke of said reciprocating members, a plurality of hollow driven reciprocating members, each coöperating with one of said driving reciprocating members, ports in each of said hollow driving and driven reciprocating members, adapted to admit liquid into the chamber between said members, and means for closing said ports during part of the movement of each member whereby a working stroke is obtained upon the coincident closing of said ports and said liquid acts to transmit power without substantial movement.

13. In a mechanical movement, a driving shaft, a crank connected thereto, means for varying the throw of said driving crank which adjusts it from a position wherein its axis of rotation is concentric with that of the driving shaft to positions of varying degrees of eccentricity, a plurality of radially arranged sets of reciprocating members, each set comprising two movable members, one of which is connected to said crank, a driven shaft, and a connection between the other reciprocating member and said driven shaft whereby the reciprocations of said member are converted into rotations of said shaft.

14. In a mechanical movement, a driving shaft, a driven shaft, a crank connected to the driving shaft, means for varying the throw of said crank which adjusts it from a position wherein its axis of rotation is concentric with that of the driving shaft to positions wherein varying degrees of eccentricity exist between such axes according to adjustment, a plurality of radially arranged sets of reciprocating members, each set comprising two hollow movable members, one of which is connected to said crank and the other of which is connected to said driven shaft, ports in each of said hollow reciprocating members adapted to admit liquid into the chamber between said members, and means for closing said ports during part of the movement of each member, whereby a working stroke is obtained upon the coincident closing of said ports and said liquid acts to transmit power without substantial movement.

15. In a mechanical movement, a driving shaft, an adjustable crank thereon, a plurality of extensible connecting rods attached to said crank, a driven shaft, and connections therefrom to each of said connecting rods for converting the reciprocating movement of said rods into rotary movement of said shaft.

16. In a mechanical movement, a driving shaft, an adjustable crank thereon, a plurality of extensible connecting rods attached to said crank, and provided with ports at each end leading into the chamber in said rod, valves adapted to close said ports as the members bearing same move inwardly whereby as the said valves open liquid is permitted to pass and as the valves close a working stroke is effected and the liquid acts as a piston and performs its work while substantially quiet, a driven shaft, and connections therefrom to each of said connecting rods for converting the reciprocating movement of said rods into rotary movement of said shaft.

17. In a mechanical movement, a driving shaft, an adjustable crank thereon, a plurality of extensible connecting rods attached to said crank, a driven shaft and connections therefrom to each of said connecting rods for converting the reciprocating movement of said rods into rotary movement of said shaft comprising a crank connected to the outer end of each of said connecting rods and a connection whereby the rotary movement of said crank is communicated to said driven shaft.

18. In a mechanical movement, a driving shaft, an adjustable crank thereon, a plurality of extensible connecting rods attached to said crank, a driven shaft and connections therefrom to each of said connecting rods for converting the reciprocating movement of said rods into rotary movement of said shaft, said connections adapted to move the connected parts of the non-working connecting rod from said driven shaft.

19. In a mechanical movement, a driving shaft, a plurality of extensible connecting rods arranged radially of said shaft, a common connection between said shaft and said rods adapted to be adjusted radially with relation to said shaft, means for periodically admitting fluid into the chamber in said connecting rods, means for sealing said fluid therein during a working stroke, a driven shaft and connections thereto from each of said connecting rods whereby the reciprocations thereof are converted into rotations of said shaft.

20. In a mechanical movement, a driving shaft, a plurality of extensible connecting rods arranged radially of said shaft, a common connection between said shaft and said rods adapted to be adjusted radially with relation to said shaft, means for periodically admitting fluid into the chamber in said connecting rods, means for sealing said fluid therein during a working stroke, a driven shaft and connections thereto from each of said connecting rods whereby the reciprocations thereof are converted into rotations of said shaft, and means for reversing the direction of movement of said driven shaft.

21. In a mechanical movement, a driving shaft, a plurality of extensible connecting rods arranged radially of said shaft, a common connection between said shaft and said rods adapted to be adjusted radially with relation to said shaft, means for periodically admitting fluid into the chamber in said connecting rods, means for sealing said fluid therein during a working stroke, a driven shaft, a crank connected to each of said connecting rods, and connections between said cranks and said driven shaft adapted to drive said shaft therefrom.

22. In a mechanical movement, a driving shaft, a plurality of extensible connecting rods arranged radially of said shaft, a common connection between said shaft and said rods adapted to be adjusted radially with relation to said shaft, means for periodically admitting fluid into the chamber in said connecting rods, means for sealing said fluid therein during a working stroke, a driven shaft, a gear thereon, a gear having a crank connection with the end of each connecting rod, and connections between each of said crank gears and said shaft gear.

23. In a mechanical movement, a driving shaft, a plurality of extensible connecting rods arranged radially of said shaft, a common connection between said shaft and said rods adapted to be adjusted radially with relation to said shaft, means for periodically admitting fluid into the chamber in said connecting rods, means for sealing said fluid therein during a working stroke, a driven shaft, a gear thereon, a gear having a crank connection with the end of each connecting rod, and connections between each of said crank gears and said shaft gear, and a reversing means for reversing the direction of movement of said driven shaft.

24. In a mechanical movement, a driving shaft, a plurality of hollow extensible connecting rods arranged radially with respect to said shaft, a common connection between said rods and said shaft adapted to be adjusted radially with relation to said shaft, ports in said connecting rods, adapted to admit fluid, valves adapted to close said ports for a working stroke, a driven shaft and connections from each of said connecting rods thereto, adapted to transform the reciprocations thereof into rotations of said shaft.

25. In a mechanical movement, a driving shaft, a plurality of hollow extensible connecting rods arranged radially with respect to said shaft, a common connection between said rods and said shaft adapted to be adjusted radially with relation to said shaft, ports in each end of said connecting rods adapted to admit fluid, rotary valves adapted to close said ports for a working stroke, a driven shaft and connections from each of said connecting rods thereto, adapted to transform the reciprocations thereof into rotations of said shaft.

26. In a mechanical movement, a driving shaft, a plurality of hollow extensible connecting rods arranged radially with respect to said shaft, a common connection between said rods and said shaft, adapted to be adjusted radially with relation to said shaft, ports in said connecting rods, adapted to admit fluid, valves adapted to close said ports for a working stroke, a driven shaft and connections from each of said connecting rods thereto, adapted to transform the reciprocations thereof into rotations of said shaft comprising rotary crank carriers, a crank in each of said carriers connected to each connecting rod and connections for conveying the rotations of said crank carriers to said driven shaft.

27. In a mechanical movement, a driving shaft, a plurality of hollow extensible connecting rods arranged radially with respect to said shaft, a common connection between said rods and said shaft, adapted to be adjusted radially with relation to said shaft, ports in said connecting rods, adapted to admit fluid, valves adapted to close said ports for a working stroke, a driven shaft and connections from each of said connecting rods thereto, adapted to transform the reciprocations thereof into rotations of said shaft, said connection adapted to move the connected parts of the non-working connecting rods from the driven shaft.

28. In a mechanical movement, a driving shaft, a plurality of hollow extensible connecting rods arranged radially with respect to said shaft, a common connection between said rods and said shaft, adapted to be adjusted radially with relation to said shaft, ports in each end of said connecting rods adapted to admit fluid, rotary valves adapted to close said ports for a working stroke, and means for reversing the position of the valves with respect to the ports in one end of said connecting rods, a driven shaft and connections from each of said connecting rods thereto, adapted to transform the reciprocations thereof into rotations of said shaft.

29. In a mechanical movement, a driving shaft, a plurality of hollow extensible connecting rods arranged radially with respect to said shaft, a crank connected to said shaft and adjustable radially thereof, a connection between each of said connecting rods and said shaft, ports in both ends of said connecting rods adapted to admit fluid, valves adapted to successively close the ports in both parts of said connecting rods as said parts move outward or away from the center, and to successively open each of said ports upon the opposite movement whereby fluid is admitted as said ports or either of them open and a working stroke is accomplished as the outward movement of both parts of each of said connecting rods coincide and the said fluid acts as a piston and transmits power without substantial movement, a driven shaft and a connection from the outer part of each of said connecting rods to said driven shaft, whereby the reciprocatory movement thereof is transformed into rotary movement of said driven shaft.

30. In a mechanical movement, a driving shaft, a plurality of hollow extensible connecting rods, arranged radially with respect to said shaft, a crank connected to said shaft and adjustable radially thereof, a connection between each of said connecting rods and said shaft, ports in both ends of said connecting rods adapted to admit fluid, valves adapted to successively close the ports in both parts of said connecting rods as said ports move outward or away from the center, and to successively open each of said ports upon the opposite movement whereby fluid is admitted as said ports or either of them open and a working stroke is accomplished as the outward movement of both parts of each of said connecting rods coincide and the said fluid acts as a piston and transmits power without substantial movement, a driven shaft, a crank carrier, a crank thereon connected to the outer member of each of said connecting rods and a connection therefrom to said driven shaft whereby the reciprocatory movement of said connecting rod is transformed into rotary movement of said driven shaft.

31. In a mechanical movement, a driving member, a driven member, two movable members, operatively connected respectively to said driving and driven members, means for permitting a liquid to pass into a chamber between said members and means for sealing said chamber whereby said liquid transmits motion from said driving to said driven elements and is free from movement at all times during such transmission.

32. In a mechanical movement, a driving shaft and a driven shaft, two movable members, a connection from one of said members to the driving shaft and means for adjusting said connection from concentricity to eccentricity and a crank connected to the other member and a connection therefrom to the driving shaft, means for permitting a liquid to pass into the chamber between said members as they separate and means for sealing said chamber as said members approach each other whereby said liquid acts as a piston in transmitting power and is free from movement while working.

33. In a mechanical movement, a plurality of transmitting devices each comprising two radially disposed members movable longitudinally with respect to each other, means for varying the relative length of stroke of said members, ports for admitting liquid into the chamber between said members, means for opening said ports as the members move inwardly and for closing them as the members move outwardly, whereby the said members move freely at all times save when their outward movement coincides and one of said members is always operating and said liquid acts to transmit power without substantial movement.

34. In a mechanical movement, a moving piston, a moving cylinder, ports in each leading to the chamber between said parts, means for opening one of said ports as said parts move or either of them moves inwardly and permitting entrance to a liquid, and means for closing both said ports for a working stroke whereby said liquid acts as a piston in transmitting power and is free from movement while working.

35. In a mechanical movement, a driving shaft, a driven shaft, a moving piston, a connection between said driving shaft and said piston and means for rendering the same eccentric, a moving cylinder, ports in said piston and cylinder leading to the chamber between said parts, means for opening one of said ports as said parts move or either of them moves inwardly and permitting entrance to a liquid, and means for closing both said ports for a working stroke whereby said liquid acts as a piston in transmitting power and is free from movement while working.

36. In a mechanical movement, a driving shaft, a driven shaft, a moving piston, a connection between said driving shaft and said piston and means for rendering the same eccentric, a moving cylinder, a crank connected to said cylinder and to said driving shaft, ports in said piston and cylinder leading to the chamber between said parts, means for opening one of said ports as said parts move, or either of them moves inwardly and permitting entrance to a liquid, and means for closing both said ports for a working stroke whereby said liquid acts as a piston in transmitting power and is free from movement while working.

37. In a mechanical movement, a driving shaft, a driven shaft, a moving piston, a connection between said driving shaft and said piston and means for rendering the same eccentric, a moving cylinder, said last mentioned parts arranged radially with respect to said driving shaft, ports in said piston and cylinder leading to the chamber between said parts, means for opening one of said ports as said parts move or either of them moves inwardly and permitting entrance to a liquid, and means for closing both said ports for a working stroke whereby said liquid acts as a piston in transmitting power and is free from movement while working.

38. In a mechanical movement, a driving shaft, a piston and cylinder, both movable in line radial with respect to the axis of rotation of said driving shaft, a driven shaft, crank connections between said piston and cylinder, and said driving and driven shafts, means for adjusting one of said crank connections with respect to its shaft whereby it may be concentric or eccentric therewith.

39. In a mechanical movement, a driving shaft, a piston and cylinder, both movable in a line radial with respect to the axis of rotation of said driving shaft, said piston and cylinder each provided with ports leading into the chamber between them and means for opening each, said ports as its members move inwardly and permitting the admission of a liquid and for closing said ports as its member moves outwardly, whereby said liquid is free from movement while working, a driven shaft, crank connections between said piston and cylinder, and said driving and driven shafts, means for adjusting one of said crank connections with respect to its shaft whereby it may be concentric or eccentric therewith.

40. In a mechanical movement, a driving shaft, a piston and cylinder, both movable in a line radial with respect to the axis of rotation of said driving shaft, a driven shaft, crank connections between said piston and cylinder, and said driving and driven shafts, means for adjusting one of said crank connections with respect to its shaft whereby it may be concentric or eccentric therewith, means for reversing the direction of movement of the driven shaft.

41. In a mechanical movement, a driving shaft, a crank connected to revolve therewith, means for adjusting said crank to concentricity or varying degrees of eccentricity with relation to said driving shaft, a radially disposed hollow piston connected to said crank, a similarly disposed hollow cylinder for said piston, a crank carrying said cylinder, a driven shaft and means for conveying the rotations of said crank to said shaft, ports in said piston and cylinder and means for opening each of said ports as its member moves inwardly, and permitting liquid to flow therein, which means are adapted to close said ports as the said member moves outwardly, whereby the said liquid performs its work without movement.

42. In a mechanical movement, a driving shaft, a crank connected to revolve therewith, means for adjusting said crank to concentricity or varying degrees of eccentricity with relation to said driving shaft, a radially disposed hollow piston connected to said crank, a similarly disposed hollow cylinder for said piston, a crank carrying said cylinder, a driven shaft and means for conveying the rotations of said crank to said shaft, ports in said piston and cylinder and means for opening each of said ports as its member moves inwardly, and permitting liquid to flow therein, which means are adapted to close said ports as the said member moves outwardly, whereby the said liquid performs its work without movement, and means for reversing the direction of movement of said driven shaft.

43. In a mechanical movement, a driving shaft, a crank connected to revolve therewith, means for adjusting said crank to concentricity or varying degrees of eccentricity with relation to said driving shaft, a plurality of radially disposed hollow pistons connected to said crank, a corresponding number of similarly disposed hollow cylinders, a crank carrying each cylinder, a driven shaft and means for conveying the rotations of said cranks to said shaft, ports in said pistons and cylinders, and means for opening each of said ports as its member moves inwardly, and permitting liquid to flow therein, which means are adapted to close said ports as the said member moves outwardly, whereby the said liquid performs its work without movement.

44. In a mechanical movement, a driving member, a member revolving therewith, and adjustable out of concentricity therewith, a plurality of hollow pistons mounted upon said revolving member and movable radially when said revolving member is adjusted eccentrically to said driving member, a hollow cylinder for each piston, a crank supporting each cylinder, ports leading into said pistons and cylinders, means for opening each of said ports as its member moves inward and for closing the ports as said member moves outward, a driven shaft, and a connection from each of said cranks to said driven shaft.

45. In a mechanical movement, a driving member, a member revolving therewith and adjustable out of concentricity therewith, a plurality of hollow pistons mounted upon said revolving member and movable radially when said revolving member is adjusted eccentrically to said driving member, a hollow cylinder for each piston, a crank supporting each cylinder, ports leading into said pistons and cylinders, mutilated flanges upon said revolving member adapted to successively uncover the piston ports upon the inward movement of the pistons and to successively cover said ports upon the outward movement of said pistons, and means for opening and closing the cylinder ports.

46. In a mechanical movement, a driving member, a member revolving therewith and adjustable out of concentricity therewith, a plurality of hollow pistons mounted upon said revolving member and movable radially when said revolving member is adjusted eccentrically to said driving member, a hollow cylinder for each piston, a crank supporting each cylinder, ports leading into said pistons and cylinders, means for successively opening the piston ports as the pistons move inwardly and for successively closing said ports as the pistons move outwardly and mutilated flanges upon the cylinder cranks, adapted to uncover said cylinder ports as the said crank moves inwardly and to cover the same as the said crank moves outwardly, a driven shaft, and a connection from each of said cranks to said driven shaft.

47. A mechanical movement comprising a crank, means for varying the throw thereof, a hollow member disposed radially thereon, a second hollow member connected to the first and to a second crank, each of said hollow members provided with ports, valves adapted to open said ports and admit liquid as the members or either of them move inward, and to close as either or both the members move outward whereby a working stroke is effected only during the outward movement of both members and the liquid acts to transmit power without moving.

48. A mechanical movement comprising a crank, means for varying the throw thereof, a hollow member disposed radially thereon, a second hollow member connected to the first and to a second crank, each of said hollow members provided with ports, valves adapted to open said ports and admit liquid as the members or either of them move inward, and to close as either or both the members move outward whereby a working stroke is effected only during the outward movement of both members and the liquid acts to transmit power without moving, and a plurality of sets of similarly arranged hollow members provided with ports, valves and cranks adapted for successive action.

49. A mechanical movement comprising a plurality of radially arranged hollow pistons and cylinders actuated from a common crank and transmitting motion to a plurality of cranks, each piston and cylinder provided with ports adapted to admit liquid, means for successively uncovering each piston port as it moves inwardly, and means for successively uncovering each cylinder port as it moves inwardly, both said means adapted to successively cover said ports upon the outward movement, whereby said liquid is adapted to transmit power without moving.

50. A mechanical movement comprising a plurality of radially arranged hollow pistons and cylinders actuated from a common crank and transmitting motion to a plurality of cranks, means for varying the throw of said common crank, each piston and cylinder provided with ports adapted to admit liquid, means for successively uncovering each piston port as it moves inwardly, and means for successively uncovering each cylinder port as it moves inwardly, both said means adapted to successively cover said ports upon the outward movement, whereby said liquid is adapted to transmit power without moving, whereby a revolution of said common crank may produce a complete revolution of each of said plurality of cranks or a partial revolution according to adjustment, and whereby said pistons and cylinders move freely with relation to each other at all times save when their outward movements coincide, and whereby one piston and cylinder are always working.

51. In a mechanical movement, a hollow extensible connecting rod comprising two relatively adjustable members, ports in each member, a valve for periodically closing one of said ports and a valve for closing the port in the other member for a working stroke, crank connections to each of the members of said connecting rod, and means for adjusting one of said cranks.

52. In a mechanical movement, a driving member, a driven member, a hollow extensible connecting rod provided with ports and valves for periodically closing same, crank connections between each end of said connecting rod and said driving and driven members, one of said crank connections being adjustable.

53. In a mechanical movement, a driving member, a driven member, a hollow extensible connecting rod provided with ports and valves for periodically closing same, crank connections between each end of said connecting rod and said driving and driven members, one of said crank connections being adjustable and a plurality of similarly arranged connecting rods, ports, valves and cranks, arranged for successive action.

54. In a mechanical movement, a driving member, a driven member, a hollow extensible connecting rod provided with ports, communicating motion from the driving to the driven member, crank connections between said connecting rod and said driving member and driven member, one of said crank connections being adjustable, and valves for closing said ports upon the outward movement of said cranks.

55. In a mechanical movement, a driving member, a driven member, a hollow extensible connecting rod provided with ports, communicating motion from the driving to the driven member, crank connections between said connecting rod and said driving member and driven member, one of said crank connections being adjustable, valves for closing said ports upon the outward movement of said cranks, and means for altering the position of one of said valves with relation to its port.

56. In a mechanical movement, a driving member, a driven member, a hollow extensible connecting rod provided with ports, communicating motion from the driving to the driven member, crank connections between said connecting rod and said driving member and driven member, one of said crank connections being adjustable, valves for closing said ports upon the outward movement of said cranks, a plurality of similarly arranged connecting rods, ports and valves having a common driving means and an individual crank connected to the driven member and adapted for successive action.

57. In a mechanical movement, two movable members, means for permitting a liquid to pass into the chamber between said members as they separate and means for sealing said chamber as said members approach each other whereby said liquid acts as a piston in transmitting power and is free from movement while working.

58. In a mechanical movement, a driving element, a driven element, a member in pivotal connection with each of said elements, means for reciprocating said member to transmit movement from said driving to said driven elements, and external means for varying the length of said member to correspondingly affect the length of stroke imparted to said driven member.

59. In a mechanical movement, a driving member, a driven member, a connecting rod comprising a cylinder provided with a port and a piston therein also provided with a port, a valve for said cylinder port and means for closing the same periodically; a valve for said piston port and means for closing the same periodically, said closures occurring simultaneously, at intervals, and means operatively connecting said rod with said driving and driven members, whereby motion of the former is imparted to the latter.

60. In a mechanical movement, a driving member, a driven member, a connecting rod comprising a cylinder provided with a port and a piston therein also provided with a port, a valve for said cylinder port and means for closing the same periodically, a valve for said piston port and means for closing the same periodically, said closures occurring simultaneously, at intervals, means operatively connecting said rod with said driving and driven members, and means for maintaining said piston and cylinder against relative movement during the operation of said driving member.

61. In a mechanical movement, a driving member, a driven member, a connecting rod comprising a cylinder provided with a port and a piston therein also provided with a port, a valve for said cylinder port and means for closing the same periodically, a valve for said piston port and means for closing the same periodically, said closures occurring simultaneously, at intervals, means operatively connecting said rod with said driving and driven members, and means for varying the degree of movement of said connecting rod, during the operation of said driving member, to correspondingly affect said driven member.

62. In a mechanical movement, for transmitting motion from one element to another element, variably, a cylinder provided with a port, a piston therein also provided with a port, means for closing said cylinder port periodically, and means for closing said piston port periodically, said closures occurring simultaneously, at intervals.

63. In a mechanical movement, for transmitting motion from one element to another element, the combination with said elements of a cylinder connected to one of said elements and provided with a port, means for closing said port periodically, a piston working in said cylinder and connected to the other elements and also provided with a port, means for closing said piston port periodically and means for varying the relationship between said port closures, to vary the speed of the driven element.

64. In a mechanical movement, for transmitting motion from one element to another element, a cylinder provided with a port, means for closing said port periodically, a piston in said cylinder also provided with a port, means for closing said piston port periodically, and means for varying the relationship between said port closures, to vary the speed of the driven element, said means comprising an adjustable crank.

65. In a mechanical movement, for transmitting motion from one element to another element, a cylinder adapted for reciprocation and provided with a port, a piston in said cylinder adapted for reciprocation and also provided with a port, means for closing said cylinder port when reciprocated in one direction and for opening the same in the other direction, means for closing said piston port when reciprocated in one direction and for opening the same in the opposite direction, and means for varying the periods of cylinder port closure with respect to the periods of piston port closure, to vary the speed of the driven element.

66. In a power transmitting mechanism, the combination with periodically moving driving and driven elements, of a power transmitting connection between said elements comprising relatively movable parts and coöperating means for trapping a liquid between said parts to hold them against relative movement during a portion of each periodic movement of one of said elements and releasing the liquid to permit free relative movement of said parts during the remainder of said periodic movement.

67. In a power transmitting mechanism, the combination with periodically moving driving and driven elements, of a power transmitting connection between said elements comprising relatively movable parts and coöperating means for alternately and successively trapping a liquid between said parts to hold them against relative movement, and releasing said liquid to permit such relative movement.

68. In a mechanical movement, a driving element, a driven element, and means including a fluid for transmitting movement from the driving to the driven element, a reservoir for the fluid in bulk and provisions for maintaining the fluid under load relatively at rest with respect to said means and separated from the bulk of fluid at all times.

69. In a mechanical movement, a driving element, a driven element, and a manually controlled variable piston and cylinder element interposed therebetween for completing a full movement of said driven element by a plurality of pulsations, one for each full movement of said driving element, said piston and cylinder element having relatively adjustable piston and cylinder members.

70. In a mechanical movement, a driving element, a driven element, and a plurality of manually controlled piston and cylinder elements each having relatively adjustable piston and cylinder members interposed therebetween for completing a full movement of said driven element by a plurality of pulsations, one for each movement of each of said interposed piston and cylinder elements.

71. In a mechanical movement, a driving element, a driven element, two movable members operatively connected, respectively to said driving and driven elements, means for permitting a fluid to pass into a chamber between said members, means for sealing said chamber whereby said fluid transmits motion from said driving to said driven elements, and is free from movement at all times during such transmission, and means for controlling the amount of fluid so sealed to vary the length of said connected members.

72. In a mechanical movement, a driving element, a driven element, two movable members operatively connected, respectively to said driving and driven elements, means for permitting a fluid to pass into a chamber between said members, a valved port at each end of said chamber to seal said chamber whereby said fluid transmits motion from said driving to said driven elements, and is free from movement at all times during such transmission, and means for controlling said valves to vary the amount of fluid sealed and thus vary the length of said connected members.

73. In a mechanical movement, a driving shaft, a driven element, and means for transmitting movement from the former to the latter including a fluid and means for subjecting said fluid to the pressure of the maximum load resistance at all times when said means are operative.

74. In a variable speed power transmission, a driving element, a driven element, and means for transmitting movement from the former to the latter including a fluid and means for subjecting said fluid to wholly static pressures proportional to the load resistances at the different speeds of transmission.

AUGUST J. MOTTLAU.

Witnesses:
 ARNOLD KATZ,
 D. STEWART.